United States Patent [19]

Phillips et al.

[11] 4,057,580

[45] Nov. 8, 1977

[54] PRODUCTION OF WATER-SOLUBLE POLYAMINE CONDENSATE POLYMERS HAVING GREATER LINEAR CHARACTERISTICS

[75] Inventors: Kenneth G. Phillips, River Forest; Edward G. Ballweber, Glenwood; Radhakrishnan Selvarajan, Oak Park, all of Ill.

[73] Assignee: Nalco Chemical Company, Oak Brook, Ill.

[21] Appl. No.: 709,029

[22] Filed: July 27, 1976

[51] Int. Cl.$^2$ .............................................. C07C 85/04
[52] U.S. Cl. ......................... 260/567.6 P; 260/585 A; 260/2 R; 260/585 R
[58] Field of Search ......... 260/567.6, 585 A, 567.6 P, 260/585 R, 585 H, 567.6 M

[56] References Cited

U.S. PATENT DOCUMENTS

| | | | |
|---|---|---|---|
| 2,049,467 | 8/1936 | Mnookin | 260/567.6 |
| 3,372,129 | 3/1968 | Phillips | 260/567.6 |

OTHER PUBLICATIONS

Suen et al., J. Polymer Sci., vol. 45, pp. 289–303, (1960).

*Primary Examiner*—Bernard Helfin
*Assistant Examiner*—James H. Reamer
*Attorney, Agent, or Firm*—John G. Premo; Robert A. Miller; Barry W. Sufrin

[57] ABSTRACT

A process for the production of water-soluble polyamine polymers by condensation reaction from ethylene dichloride and ammonia under pressure of 4–10 atmospheres which is conducted in two stages:

1. reacting ethylene dichloride and ammonia at a temperature of about 110°–120° C and at a pH of 9.0–10.0 for 1–3 hours in the presence of a first amount of alkali metal hydroxide to produce a polyamine reaction mixture; and
2. thereafter adding to said polyamine reaction mixture a second equal amount of alkali metal hydroxide wherein the total of the first and second amounts is equivalent to about 150% based on the equivalent weight of the available chlorine present and continuing heating the reaction mixture for about 8–12 hours at about 102°–112° C to produce a polyamine condensate polymer product of increased linear characteristics and thereafter quaternizing the product with methyl chloride.

5 Claims, No Drawings

PRODUCTION OF WATER-SOLUBLE POLYAMINE CONDENSATE POLYMERS HAVING GREATER LINEAR CHARACTERISTICS

The present invention relates to a method or process for increasing the linear regularity or characteristics of water-soluble polymers resulting from the condensation of an ethylene dihalide; e.g., ethylene dichloride, with ammonia. The technique facilitating the advantages to the process is occasioned by splitting the amount of the alkali metal hydroxide used in neutralization between two stages of the reaction and utilizing a total amount of alkali metal hydroxide or base which is about 1.5 times the available amount of chlorine present. Thus, in the preferred method a two-stage process is used wherein in the first stage ethylene dichloride and ammonia are condensed under pressure in a manner similar to known prior art procedures and utilizing an initial amount of hydroxide amounting to about one-half the total. This first stage is carried out under pressure where the ammonia gas and ethylene dichloride are charged into the reactor under slow addition of caustic for about 1-3 hours about about 110-120° C. Subsequently, in a second stage there is used an ameliorated process condition of temperature and pressure and using an additional one-half amount of alkali metal hydroxide; e.g., sodium hydroxide, making the total amount of base utilized equivalent to about 150% based on the equivalent weight of the available chlorine present. This alkali treatment involves the heating of the polyamine condensate product with concentrated sodium hydorixde solution in excess of the amount of chloride present for 3-10 hours at about 90°-120° C under pressure. As a supplemental operation, this product is then preferably quaternized at a pH 13.0-13.5 with methyl chloride with no caustic added to achieve a final pH of about 8.0.

THE REACTANTS

Ammonia. The ammonia in the initial heel is aqueous, but additional ammonia added during the course of the reaction is preferably added in liquid form in order to maintain high concentrations of product. The use of $NH_3$ in liquid form makes necessary the use of closed reaction conditions in the process. Ammonia seems to have reacted largely as a bifunctional base in the production of the water-soluble condensate polymers produced.

Ethylene Dihalide. The ethylene dihalides useful in the preparation of polymers of this invention are from the group of ethylene dichloride, ethylene dibromide and ethylene diiodide. While any of the above three members of this group will prepare polymers within the course of this invention, ethylene dichloride is preferred due to its low cost and commercial availability. It is noted that each mole of ethylene dichloride provides two equivalents of chloride or chlorine.

Alkali Metal Hydroxide. Sodium hydroxide, of the available alkali metal hydroxides, is utilized primarily for cost reasons. Also, a concentrated solution such as 50% aqueous is preferred.

PRIOR ART

T. J. Suen et al, "Polycondensation of Alkylene Dichlorides with Alkylene Polyamines," Journal of Polymer Science 45:289-303 (1960) gives an extensive literature backdrop including the parameters for production of liquid polymers and gellation and the kinetics therefor.

In the patented art the following U.S. patents are deemed of interest:

U.S. Pat. No. 2,028,041 Bersworth — Ethylene dichloride and ammonia are reacted to form ethylene diamine which is dehydrated by caustic.

U.S. Pat. No. 2,049,467 Mnookin — This patent teaches the production of olefin-polyamines from ethylene dichloride and ammonia using a large proportion of water and the reaction is carried out at about 140—300° C.

U.S. Pat. No. 3,151,163 Nussbaum — This patent shows adding additional ammonia to facilitate the separation of amines obtained by direct amination of aliphatic chlorides and neutralization by strong base.

U.S. Pat. No. 3,448,152 Milligan et al — In the reaction of ethylene dichloride with ammonia, sodium hydroxide is added to the mixture in amount equivalent to the chloride present.

U.S. Pat. No. 3,862,234 Steele — Again the manufacture of ethylene amines from ethylene dichloride and ammonia is characterized by the addition or use of sodium hydroxide equivalent to the chloride present.

THE GENERALIZED REACTION

In reacting ammonia using an alkylene dihalide such as ethylene dichloride, the general condensation reaction is well known and the preparation of the polyamines or polyalkylene polyamines is described in The Encyclopedia of Polymer Science and Technology, 10:616-619 (1967) under the title "Polyamines" and also in the same encyclopedia, Volume 7, pages 64-77, under the title "Flocculation."

In the production of the present water-soluble liquid condensate polymers of low molecular weight resulting from the condensation of ethylene dichloride and ammonia, it has been found that the polymers produced are generally linear but contain a troublesome amount of pendant crosslinking groups, which are pendant chloroethyl groups, and ethylenic bridges shown as I and II below:

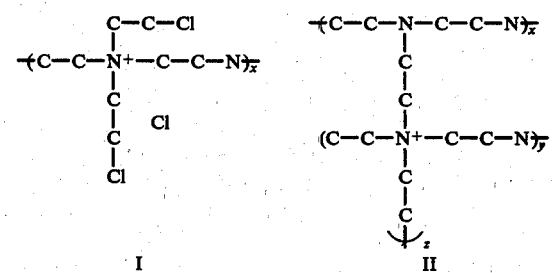

The present invention is devoted to a process which by a superior amount of alkali digestion will increase the activity of the polymer in a linear direction by breaking the crosslinks at the quaternary sites and rendering the polymer essentially linear. It is theorized that the caustic treatment of the present process leads to a Hofmann elimination, thereby destroying the crosslinks and affording a more linear polymer as shown below:

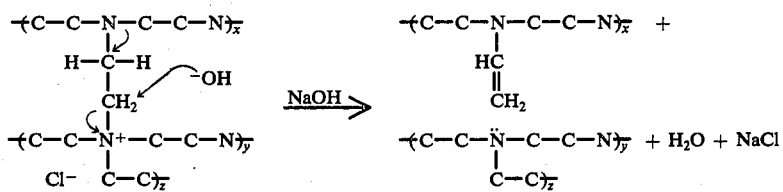

The prior alkali digestion has been found to increase the activity of the quaternized polymer in water treatment by a factor of 15% when compared with untreated polymer.

EXAMPLE

A scaled down pilot plant operation for the manufacture of liquid polyamine condensate polymers was used utilizing the following manufacturing procedure.

Materials needed:

| | |
|---|---|
| Process water | 277 g |
| Ammonia | 284 g |
| Ethylene dichloride | 1040 g |
| 50% caustic soda | 2411 g |
| Methyl chloride | 842 g |

The process water was first metered into the reactor. The reactor was agitated and vacuum was applied. When the vacuum dropped to 27-29 inches, ammonia was metered in and the contents were heated to 113° C using a steam jacket. Then ethylene dichloride was also continuously pumped in. The subsequent reaction was carried out at about 4 atmospheres or 60 psi for 2 hours. Additional runs were made varying the process parameters to 4-10 atmospheres or 60-130 psi for 1-3 hours. After a fifth of ethylene dichloride was pumped in, the caustic addition was started and the pH was maintained at 9.0-9.5. Ammonia addition was completed, followed by that of ethylene dichloride. Thereafter, the caustic addition was slowed down. The reaction was continued until 1200 g of caustic NaOH was added and the desired viscosity had been obtained.

In a second stage the reactor was cooled to 70° C and ammonia was vented to a scrubber until the pressure dropped to 0 psi. More caustic, NaOH, 1200 g, was pumped in, the reactor was closed, the mixture was heated to 107° C and the temperature was maintained for 8 hours. During this time the pressure was maintained at about 4 atmospheres or 60 psi. In subsequent runs the parameters for pressure and time were varied so that the reactor was maintained from 4-10 atmospheres or 60 -130 psi and the reaction time was from 3-10 hours. Periodically the pH was checked and it was maintained at about 13.0. Small amounts of caustic were added if necessary for pH adjustment. Then the reactor was cooled to 70° C and ammonia was vented as in stage 1 above and 60-90 ml of condensate was collected under vacuum.

Quaternization of the polyamine condensate was then effected by pumping in methyl chloride maintaining the temperature about 75° C and 130 psi. After adding the quaternizing amount of methyl chloride, the reaction mixture was kept stirred for 30 minutes whereupon the pressure dropped to 60 psi. The product was cooled to 40° C and centrifuged to free from sodium chloride. The centrifugate was a pale brown solution. Upon dilution to 30% actives, it had an intrinsic viscosity 0.08 ($M_w$ - 7,000) and a replacement ratio, in water clarification, 0.8-0.85 compared to an untreated quaternized sample of a similar ethylene dichloride ammonia condensate product, and a chlorine index of 1.0.

We claim:

1. In a process for the production of water-soluble polyamine polymers by condensation reaction from ethylene dichloride and ammonia under pressure of 4-10 atmospheres, the improvement which comprises conducting the reaction in two stages and
   1. reacting ethylene dichloride and ammonia at a temperature of about 110-120° C and at pH of 9.0-10.0 for 1-3 hours in the presence of a first amount of alkali metal hydroxide to produce a polyamine reaction mixture; and
   2. thereafter adding to said polyamine reaction mixture a second equal amount of alkali metal hydroxide wherein the total of the first and second amounts is equivalent to about 150% based on the equivalent weight of the available chlorine present and continuing heating the reaction mixture for about 8-12 hours at about 102°-112° C to produce a polyamine condensate polymer product of increased linear characteristics.

2. The process according to claim 1 wherein the alkali metal hydroxide is sodium hydroxide.

3. The process according to claim 1 wherein the alkali metal hydroxide is introduced slowly and incrementally.

4. The process according to claim 1 wherein the polyamine condensate polymer product is subsequently quaternized with a methyl halide in the absence of added alkali metal hydroxide.

5. The process according to claim 1 wherein the methyl halide is methyl chloride.

* * * * *